United States Patent
Kirshner

(10) Patent No.: US 10,044,509 B1
(45) Date of Patent: Aug. 7, 2018

(54) METHOD FOR ENCRYPTING AND STORING DATA

(71) Applicant: FMR LLC, Boston, MA (US)

(72) Inventor: Jake Kirshner, Salt Lake City, UT (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/676,673

(22) Filed: Aug. 14, 2017

(51) Int. Cl.
  *H04L 9/32* (2006.01)
  *H04L 9/08* (2006.01)
  *H04L 9/14* (2006.01)
  *H04L 9/30* (2006.01)
  *H04L 29/06* (2006.01)

(52) U.S. Cl.
  CPC .......... *H04L 9/3247* (2013.01); *H04L 9/0819* (2013.01); *H04L 9/14* (2013.01); *H04L 9/30* (2013.01); *H04L 63/045* (2013.01)

(58) Field of Classification Search
  CPC ....... H04L 9/3247; H04L 9/0819; H04L 9/14; H04L 9/30; H04L 63/045
  USPC .......................................................... 713/176
  See application file for complete search history.

(56) References Cited

U.S. PATENT DOCUMENTS

| | | | |
|---|---|---|---|
| 6,061,448 | A | 5/2000 | Smith et al. |
| 9,100,186 | B2 | 8/2015 | O'Hare et al. |
| 9,432,346 | B2 | 8/2016 | Madden |
| 9,819,648 | B1 * | 11/2017 | Chilakapati ......... H04L 63/0428 |
| 2007/0050628 | A1 * | 3/2007 | Ochi ...................... G06F 21/606 713/176 |
| 2010/0239093 | A1 * | 9/2010 | Hotta ...................... G06F 21/35 380/270 |
| 2012/0060035 | A1 * | 3/2012 | Kalmady ............ G06F 21/6209 713/176 |

(Continued)

OTHER PUBLICATIONS

Federal Information Processing Standards Publication 197 "Announcing the Advanced Encryption Standard (AES)" Nov. 26, 2001, retrieved from the internet on Aug. 14, 2017 via: http://nvlpubs.nist.gov/nistpubs/FIPS/NIST.FIPS.197.pdf (page relocated from http://csrc.nist.gov/publications/fips/fips197/fips-197.pdf).

(Continued)

*Primary Examiner* — Matthew T Henning
(74) *Attorney, Agent, or Firm* — Proskauer Rose LLP

(57) ABSTRACT

Systems and methods for securely uploading a data file are presented. A client generates a symmetric encryption key and an initialization vector; encrypts the data file using the symmetric encryption key and the initialization vector; places an upload request with a server to upload the encrypted data file to a first storage device; receives from the server via the communications network, asymmetric encryption components, a signed data file upload URL accessible by the communications network, and a signed key data upload URL accessible by the communications network; encrypts, using the asymmetric encryption components, the symmetric encryption key and the initialization vector, thereby creating encrypted key information; sends, via the signed data file upload URL, the encrypted data file to the first storage device; and sends, via the signed key data upload URL, the encrypted key information to a second storage device.

30 Claims, 5 Drawing Sheets

(56) References Cited

U.S. PATENT DOCUMENTS

| | | | |
|---|---|---|---|
| 2014/0013375 A1* | 1/2014 | Giladi | H04L 67/108 725/112 |
| 2014/0143548 A1 | 5/2014 | Wang | |
| 2015/0161409 A1 | 6/2015 | Szebeni et al. | |
| 2015/0381588 A1* | 12/2015 | Huang | H04L 63/0435 713/153 |
| 2016/0239674 A1 | 8/2016 | Bao et al. | |
| 2017/0061138 A1* | 3/2017 | Lambert | H04L 63/18 |
| 2018/0025167 A1* | 1/2018 | Bohli | G06F 21/602 |

OTHER PUBLICATIONS

Tresorit, "White Paper", retrieved from the internet on Jul. 27, 2017 via: https://tresorit.com/files/tresoritwhitepaper.pdf.

* cited by examiner

```
{
key: symmetric key,
iv: initialization vector,
}
```
200

FIG. 2

```
{
e: public exponent,
d: private exponent,
p: prime factor,
q: prime factor,
n: p * q,
u: d mod (p - 1),
v: d mod (q - 1),
k: 1 / q mod p,
}
```

300

FIG. 3 s = format(key, iv)
m = padding(length: length(n) - (length(i), length(j)) - length(s)) + i + j + s
c = m$^e$ mod n

505 Generating, by the client, a symmetric encryption key and an initialization vector.

510 Encrypting, by the client, the data file using the symmetric encryption key and the initialization vector, thereby creating an encrypted data file.

515. Placing an upload request, by the client, to upload the encrypted data file to a first storage device, the upload request placed with an application server in communication with the client via a communications network.

520 Receiving, by the client, from the application server via the communications network, asymmetric encryption components, a signed data file upload URL accessible by the communications network, and a signed key data upload URL accessible by the communications network.

525 Encrypting, by the client, using the asymmetric encryption components, the symmetric encryption key and the initialization vector, thereby creating encrypted key information..

530 Sending, by the client, via the signed data file upload URL, the encrypted data file to the first storage device.

535 Sending, by the client, via the signed data file upload URL, the encrypted data file to the first storage device.

METHOD FOR ENCRYPTING AND STORING DATA

TECHNICAL FIELD

This application relates generally to systems, methods and apparatuses, including computer programs, for encrypting and storing data. More specifically, this application relates to uploading data from a client to a server via a communications network in a way that does not depend on network communication security.

BACKGROUND

Some remote data storage platforms rely on network communication such as Secure Sockets Layer (SSL) or Transport Layer Security (TLS) to ensure that client data is transmitted in an encrypted format. Other platforms support direct file encryption and either use client storage to manage asymmetric key pairs allocated on a per-user basis or envelope encryption to sign upload requests. However, such techniques have a number of shortcomings.

For example, while secure network connections can be necessary for encrypted communications between a client and a server, they can be vulnerable to a variety of Man-in-the-Middle and SSL Downgrade attacks. In such situations, supported SSL Cipher Suites need to be updated as vulnerabilities are discovered in existing protocols. In addition, other HTTP mechanisms such as Strict Transport Security and Public Key Pinning may assist in increasing the security behind SSL and TLS connections. However, ultimately any unencrypted data uploaded behind these protocols is only as secure as the network connection.

To mitigate against these vulnerabilities, some end-to-end encrypted storage platforms symmetrically encrypt data prior to uploading the data. In some cases, the keys used to encrypt the data can be stored locally. However, this method requires manual copying of the keys to access the data from a new client, and consequently, if the locally stored keys are lost, the data may be unrecoverable. Another possibility is to use asymmetric certificate signing when data is shared between clients. However, this operation requires that the symmetric key be signed by a remote server for each additional client. As a result, server processing time can be increased as new certificates must be generated each time encrypted file data is requested.

One prior art system, shown in U.S. Pat. No. 6,061,448 to Smith (Method and System for Dynamic Server Document Encryption, issued May 9, 2000), describes a delivery server that manages and coordinates asymmetric keys that are used for encrypting a symmetric data key. However, this method requires that either the encrypting client or the delivery server be responsible for forwarding the encrypted data, and key, to recipient clients, resulting in the need for management of the encrypted data, encrypted keys and recipient public keys to be by one source. Furthermore, because each recipient uses a different public key, the encrypting client must then re-encrypt the file data encryption key for each recipient, adding increased latency to the system. Another prior art system, shown in U.S. Patent Pub. No. 2015/0161409 to Szebeni (Method and system for handling of group sharing in a distributed data storage, particularly in p2p environment, published Jun. 11, 2015), uses a Key Lock Box (KLB) for storing data keys in an encrypted format. However, this system uses client bandwidth and space to distribute segments of the encrypted data across all connected peers, resulting in the availability of users encrypted file data to be contingent on the number of connected peers with access to the correct distributed segments.

SUMMARY

Accordingly, there is a need for improved systems, methods and apparatuses to provide a more effective and efficient means to upload data from a client (e.g., a remote computing device operated by a user) to a server (e.g., an application server) via a communications network in a way that is independent of network communication security. The current invention describes methods and apparatuses for encrypting and uploading data in a client-server application environment, whereby neither unencrypted data nor unencrypted key information are transferred over the network. The client uses a combination of symmetric file encryption and asymmetric key encryption to encrypt the data, which is then uploaded privately without the need to store sensitive key data locally. Asymmetric key information (e.g., asymmetric encryption components) is unique to each upload request, allowing for it to be shared with other users without requiring either data or key re-encryption and without compromising the security of any other uploaded files. The client uploads the encrypted file data and encrypted key data to remote storage that is independent of the server allowing for the data to be sent without slowing down other server requests.

Generally, a client can use a symmetric key and an initialization vector it randomly generates to encrypt data. After this operation is completed, a request for signed upload URLs, as well as a public exponent and modulus for asymmetrically encrypting the symmetric key and initialization vector, is sent to the server. The server remotely pairs the asymmetric modulus, exponent and prime factors, with a record of the upload request, to enable an authenticated client to retrieve and decrypt the data without requiring it to manage the cryptographic keys.

In one aspect, the invention features a computer-implemented method of securely uploading a data file using a client. The method includes generating, by the client, a symmetric encryption key and an initialization vector. The method also includes encrypting, by the client, the data file using the symmetric encryption key and the initialization vector, thereby creating an encrypted data file. The method also includes placing an upload request, by the client, to upload the encrypted data file to a first storage device, the upload request placed with a server (e.g., an application server) in communication with the client via a communications network. The method also includes receiving, by the client, from the server via the communications network, asymmetric encryption components, a signed data file upload URL accessible by the communications network, and a signed key data upload URL accessible by the communications network. The method also includes encrypting, by the client, using the asymmetric encryption components, the symmetric encryption key and the initialization vector, thereby creating encrypted key information. The method also includes sending, by the client, via the signed data file upload URL, the encrypted data file to the first storage device. The method also includes sending, by the client, via the signed key data upload URL, the encrypted key information to a second storage device.

In some embodiments, the symmetric encryption key and the initialization vector further comprises serializing, by the client, the symmetric encryption key and the initialization vector, thereby creating a serialized key data object; and/or structure padding, by the client, the serialized key data object to a predetermined length based on a size of an asymmetric key pair included in the asymmetric encryption components, thereby creating a byte padded key data object. In some embodiments, the method includes creating, by the server, a record associating the client with the upload request, the record including a key-value map of asymmetric encryption components. In some embodiments, the method includes storing, by the first storage device, the encrypted data file. In some embodiments, the method includes storing, by the second storage device, the encrypted key information.

In some embodiments, the symmetric encryption key includes a block cipher that utilizes the initialization vector to randomize repeated sequences in the data file. In some embodiments, the initialization vector is unique to the upload request. In some embodiments, the initialization vector is generated independently of the encrypted data file or the encrypted key information. In some embodiments, the initialization vector is generated independently of previous encryption requests. In some embodiments, the serialized key data object is structure padded with nondeterministic random data. In some embodiments, the serialized key data object is created prior to placing the upload request. In some embodiments, the server does not read or receive either the symmetric encryption key or the initialization vector in either encrypted or unencrypted form.

In some embodiments, the server does not read or receive the data file or the encrypted data file. In some embodiments, the asymmetric encryption components include an asymmetric key pair including a private exponent and a public exponent, a modulus, prime factors, and precomputed remainders. In some embodiments, the asymmetric key pair is unique to the upload request. In some embodiments, the server does not sign the asymmetric key pair. In some embodiments, the server does not use the asymmetric key pair for any purpose other than to associate the asymmetric encryption components with the upload request. In some embodiments, the server provides only asymmetric key information required for encryption associated with the upload request.

In some embodiments, the first storage device is independent of, and remote from, the server. In some embodiments, the second storage device is independent of, and remote from, the server. In some embodiments, the first storage device is independent of the second storage device. In some embodiments, the signed data file upload URL includes only write-only access to the first storage device and the signed key data upload URL includes only write-only access to the second storage device. In some embodiments, the server generates the signed key data upload URL with a first predetermined timeout threshold and the signed data file upload URL with a second predetermined timeout threshold. In some embodiments, the serialized key data object is in key-value format. In some embodiments, the record is specific to the upload request. In some embodiments, the signed data file upload URL and the signed key data upload URL are each encoded with a timeout parameter and address restrictions. In some embodiments, the asymmetric encryption components are delivered in an unencoded format. In some embodiments, the encrypted data file and the encrypted key information are cacheable locally on the client in an encrypted format.

In another aspect, the invention features a system configured to upload securely a data file. The system includes a client configured to generate a symmetric encryption key and an initialization vector. The client is also configured to encrypt the data file using the symmetric encryption key and the initialization vector, thereby creating an encrypted data file. The client is also configured to place an upload request to upload the encrypted data file. The client is also configured to receive asymmetric encryption components, a signed data file upload URL, and a signed key data upload URL. The client is also configured to encrypt, using the asymmetric encryption components, the symmetric encryption key and the initialization vector, thereby creating encrypted key information. The client is also configured to transmit data over a communications network in communication with the client. The system also includes a server in communication with the communications network. The server is configured to receive the upload request. The server is also configured to create a record associating the client with the upload request. The server is also configured to provide the client the asymmetric encryption components, the signed data file upload URL, and the signed key data upload URL. The system also includes a first storage device in communication with the communications network. The first storage device is configured to receive and store the encrypted data file. The system also includes a second storage device in communication with the communications network. The second storage device is configured to receive and store encrypted key information.

In some embodiments, the first storage device is independent of, and remote from, the server. In some embodiments, the second storage device is independent of, and remote from, the server. In some embodiments, the first storage device is independent of the second storage device. In some embodiments, the server does not read or receive either the symmetric encryption key or the initialization vector in either encrypted or unencrypted form. In some embodiments, the server does not read or receive the data file or the encrypted data file.

In some embodiments, a data file is encrypted using non-deterministic symmetric key data that is specific to only that data file. In some embodiments, symmetric key data is encrypted using a non-deterministic asymmetric keypair that is specific to that data. In some embodiments, the asymmetric keypair is not associated with the user or the client device and/or is derived from or associated with user or file record data. In some embodiments, encrypted file data can be shared, as can encrypted key data and an asymmetric keypair, without requiring re-encryption of file data or key data for each sharee user or device. In some embodiments, the asymmetric keypair is generated by a server during the encrypted file upload request of a client device and only the components of the keypair required for encryption are delivered to the client device in the response. In some embodiments, this configuration prevents a potential attacker from being able to decrypt the encrypted symmetric key information during the upload of the encrypted file data and file key.

In some embodiments, a client device sends the encrypted file upload request only after generating the non-deterministic symmetric key data and encrypted the unencrypted file data using that symmetric key data. In some embodiments, this configuration minimizes the amount of computing time required by the client device after receiving an upload request response from the server so that signed URLs with low timeout thresholds can be used for uploading the encrypted file data and encrypted file key. In some embodiments, encrypted file data, encrypted key data and/or asymmetric keypairs are stored independently of each other and do not pass through a single server. This configuration can prevent a single server from being able to decrypt the encrypted file data and can allow the server, the encrypted file data store and encrypted file key store all to operate independently without having access to each other.

The invention includes a number of advantages over prior approaches. A further deterrent against brute force attacks on encrypted data is provided, as successful hacking against the invention requires not only guessing the correct symmetric key but also guessing the correct starting vector for substitution operations. Additionally, padding these values before sending the initial upload request to the server reduces the number of operations needed to upload the encrypted data and keys, thereby decreasing the possible timeout threshold for signed URLs. Additionally, if an upload request is intercepted, encrypted data will not be decipherable to the attacker, as the asymmetric key information captured would not contain enough information to decrypt the file key information. If a user wants to share an encrypted file with another user, the asymmetric key information can be shared without putting the sharing user's other files at risk.

In some embodiments, the server stores the asymmetric key data in a key-value object notation matching the notation used by the client for the symmetric key and initialization vector, thereby reducing the time required for encryption. In some embodiments, the client is agnostic to the size of the asymmetric key as long as it is larger than the formatted key data. In some embodiments, data can be securely shared between clients without requiring the server to resign each request. In some embodiments, it is advantageous that each network request handler operates independently of the others. Storage devices can be distributed, allowing for faster and easier access to the encrypted file and the encrypted key data. Encrypted file data and encrypted file key information can be easily uploaded to different storage devices without requiring a response to be sent from each storage device after a client's initial file upload request.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 2 shows a format for a symmetric key, according to an illustrative embodiment of the invention.

FIG. 3 shows a format for an asymmetric key, according to an illustrative embodiment of the invention.

FIG. 4 shows a format for a symmetric key encryption algorithm, according to an illustrative embodiment of the invention.

FIG. 5 shows a flow chart of a method for encrypting and uploading a data file, according to an illustrative embodiment of the invention.

DETAILED DESCRIPTION

Figure 1:
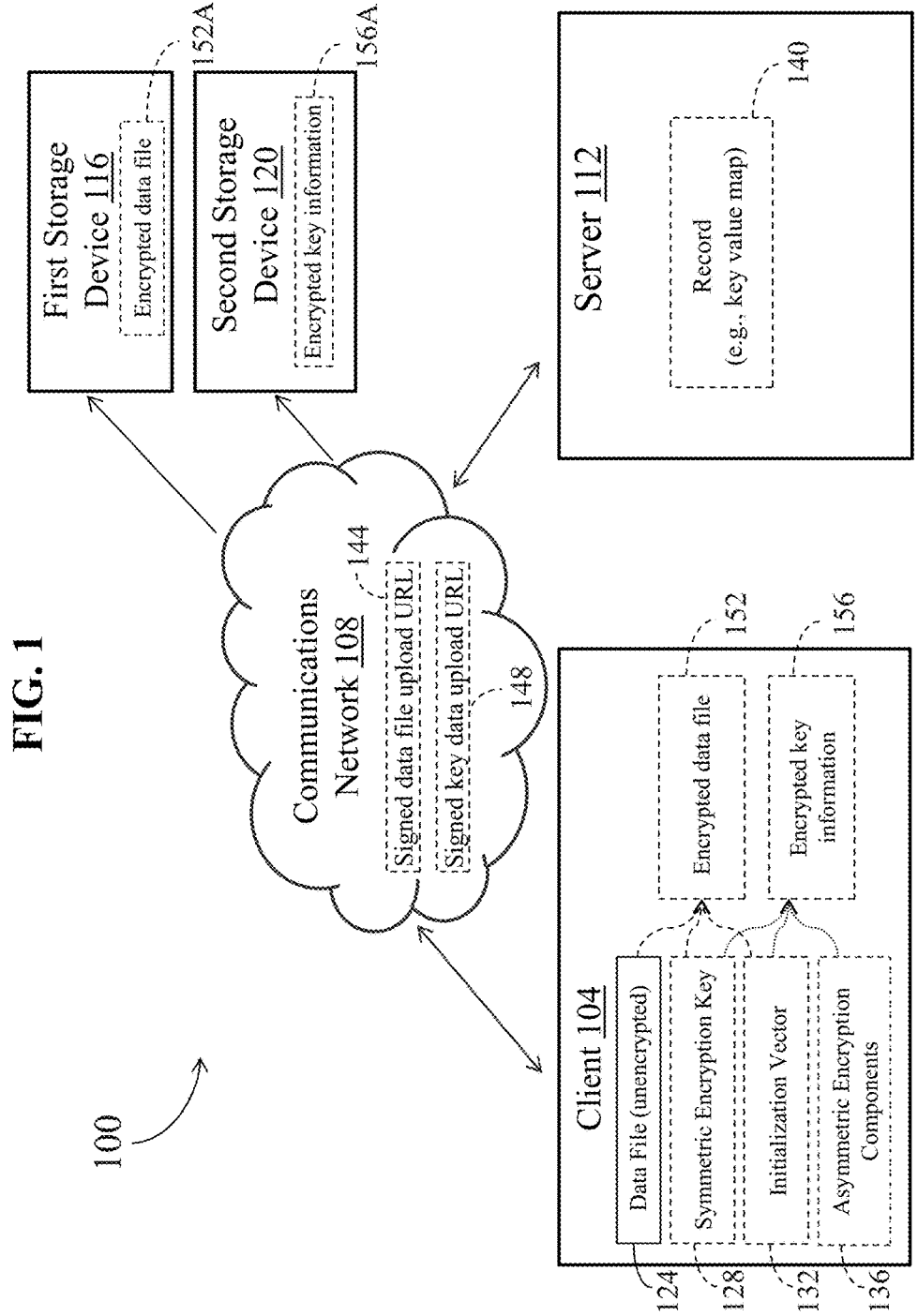
FIG. 1 shows a schematic diagram of a system for encrypting and uploading a data file, according to an illustrative embodiment of the invention.

FIG. 1 shows a schematic diagram of a system 100 for encrypting and uploading a data file 124, according to an illustrative embodiment of the invention. The system 100 includes a client 104 (e.g., any computing device or front end component) including a data file 124, a communications network 108, a server 112 (e.g., an application server), a first storage device 116, and a second storage device 120. The client 104 is in communication, via the communications network 108, with the server 112, the first storage device 116, and the second storage device 120. The client 104 can be any laptop, portable or handheld device capable of storing and processing data, and can contain one or more applications for executing the functions described herein. The communications network 108 can be any network, including one that is not secure, e.g., networks that transmit data in plaintext, networks that use certificates by unknown certificate authorities, and/or networks that use depreciated or compromised cipher suites. The server 112 can be, for example, a single device running the server application or a distributed set of devices running the server application that handles requests via load balancing. The first storage device 116 and the second storage device 120 can be any device suitable for storing data in permanent memory, e.g., a remote persistent store such as Content Distribution Networks, WebDAV servers, and/or SCP/SFTP servers.

During operation, the client 104 generates a symmetric encryption key 128 and an initialization vector 132. For example, the client 104 can generate a 256-bit key, which can be used to derive a round key for each operation of the Substitution-Permutation Network using a 128-bit initialization vector as the initial state. The client 104 encrypts the data file 124 using the symmetric encryption key 128 and the initialization vector 132, thereby creating an encrypted data file 152. In some embodiments, the encrypted data file 152 is written into cache of the client 104. The initialization vector 132 can be a random initialization vector suitable for use with Substitution-Permutation Network (SPN) operations. In some embodiments, the data file 124 is encrypted by the client 104 using a precomputed substitution table following the steps outlined in the Rijndael Advanced Encryption Standard (AES).

The symmetric encryption key 128 and the initialization vector 132 can be serialized into a single object format and byte padded to a predetermined length based on the size of the asymmetric key. For example, after the data file 124 has been encrypted, the 256-bit symmetric key and 128-bit initialization vector can be serialized into a key-value format, e.g., the format 200 as shown in FIG. 2, and converted into a string with UTF-8 encoding. The string can then be padded to a length of 256-bytes (2048-bits) using predetermined integers i, j and an optional hash function. In such a method, the length of the unpadded symmetric key 128 and initialization vector 132 can be less than the length of the asymmetric key modulus.

The client 104 then places an upload request to upload the encrypted data file 152 to the server 112 via the communications network 108. In some embodiments, this request does not contain the data file 124 (or the encrypted data file 152), the symmetric encryption key 128, or the initialization vector 132. The server 112 receives the upload request and creates a record 140 associating the client 104 with the upload request. In some embodiments, the record 140 contains a key-value map of an asymmetric key pair's private and public exponents, modulus, prime factors and precomputed remainders that are specific to the upload request. The key value map can take the 2048-bit asymmetric key format 300 shown in FIG. 3 for the padded symmetric key data. The server 112 responds to the client 104 by providing asymmetric encryption components 136, e.g., values of "e" (public exponent) and "n" (modulus), a signed data file upload URL 144, and a signed key data upload URL 148 (e.g., SHA1 signed hashes of upload URLs), to the client 104 via the communications network 108. The signed URLs 144, 148 are encoded with both a timeout parameter and address restrictions. Consequently, their validity is limited to an extremely short time period.

The client 104 receives the asymmetric encryption components 136, the signed data file upload URL 144, and the signed key data upload URL 148. The client 104 encrypts, using the asymmetric encryption components 136, the symmetric encryption key 128 and the initialization vector 132, thereby creating encrypted key information 156. For example, the client 104 can use the values for "e" and "n" to encrypt the padded symmetric key and initialization vector as an integer array of unicode character values, e.g., according to the algorithm 400 shown and described in FIG. 4. In some embodiments, the encrypted key information 156 is written into cache of the client 104. The client 104 sends the encrypted data file 152 to the first storage device 116 via the communications network 108. The first storage device 116 receives and stores a copy of the encrypted data file 152A. The client 104 sends the encrypted key information 156 to the second storage device 120 in communication with the communications network 108. The second storage device 120 receives and stores a copy of the encrypted key information 156A.

At this point, all three components required to view the unencrypted information are located separately, thereby eliminating the need to pass this vulnerable information through a single delivery or signing server. Neither the data file 124, nor the symmetric encryption key 128, nor the initialization vector 132 used to encrypt the symmetric encryption key 128 have at any time been transmitted over the communications network 108 in unencrypted form. The client 104 is able to view or share the encrypted data file 152 by requesting the asymmetric encryption components 132 and signed URLs 144, 148 for downloading the encrypted data and key without requiring the server 112 to sign or process the symmetric key.

A number of factors discussed above improve upon the capabilities of existing encryption techniques. By permuting and wrapping the initialization vector with the asymmetric data key, an additional deterrent against brute force attacks on the encrypted data file 152 is added because successful decryption from an outside source requires not only guessing the correct symmetric key but also guessing the correct initialization vector for substitution operations. Additionally, padding these values before sending the initial upload request to the server 112 reduces the number of operations needed to upload the encrypted data and keys, thereby decreasing the possible timeout threshold for signed URLs. Consequently, not only is it much more difficult for an attacker to decipher any intercepted data, but the period of time to do so is also significantly reduced.

In addition, the server 112 stores the asymmetric key data in a key-value object notation matching the notation used by the client 104 for the symmetric key and initialization vector. Thus, the time required for encryption is reduced, as the client 104 is not required to import the key in standard PKCS or PKIX formats. In addition, asymmetric encryption is accomplished by using the integer values of the public exponent and modulus to calculate the modular exponent of the numerical character values of the key and the initialization vector. This operation employs the same encoding format for key data with all clients by using a standard library or precomputing the character tables (e.g., when a client application is launched). The above method of symmetric key encryption also allows the client 104 to be agnostic to the size of the asymmetric key as long as it is larger than the formatted key data. The amount of padding around the unencrypted data can be adjusted to match the bit length of the modulus. Furthermore, by establishing specific asymmetric keys for each data file, data can be securely shared between clients without requiring the server 112 to resign each request.

In some embodiments, the server 112 generates an asymmetric key pair that is independent of any client user or device information and then delivers only the modulus and public exponent to the client 104 for file key encryption. In this case, if an upload request is intercepted, the data will not be decipherable to the attacker as the asymmetric key information that was captured would not contain enough information to decrypt the file key information. Additionally, because the asymmetric file key encryption information is generated independently of any client user or device information (e.g. not using a client device's Unique ID), if a user wants to share an encrypted file with another user, the asymmetric key information can also be shared without putting the sharing user's other files at risk.

The system 100 can be designed to allow each network request handler to operate independently of the others. After a file upload request is sent, the response can be delivered directly from the network device to which the request was sent without the network device needing to send or receive information from any storage device. Because the storage devices 116, 120 use signed URLs to authorize upload and download requests independently of any user or device information, they do not need to communicate with the network device that originally handled the user's upload request and do not need to run any application logic allowing them to operate as static file storage. In such embodiments, their data can be distributed, allowing for faster and easier access to the encrypted file and the encrypted key data. Not having the storage device authenticated via the original network device also means that the encrypted file data and encrypted file key information can be easily uploaded to different storage devices without requiring a response to be sent from each storage device after a client's initial file upload request.

The system 100 can be designed to separate the server requests from the transmission of encrypted file and key data. This separation allows for an application server to handle a greater volume of user traffic than a centralized system as the device will not be restricted by sending or receiving large amounts of encrypted data. Additionally, by having the client perform all the file and key encryption steps, an application server is able to handle a large number of simultaneous upload requests while waiting for each client to complete the encryption processes.

FIG. 5 shows a flow chart of a method for encrypting and uploading a data file, according to an illustrative embodiment of the invention. The method 500 is described from the perspective of the client (e.g., the client 104 shown and described above in connection with FIG. 1). In a first step 505, the client generates a symmetric encryption key and an initialization vector. In a second step 510, the client encrypts the data file using the symmetric encryption key and the initialization vector, thereby creating an encrypted data file. In a third step 515, the client places an upload request to upload the encrypted data file to a first storage device, the upload request placed with a server (e.g., the server 112 shown and described above in connection with FIG. 1) in communication with the client via a communications network (e.g., the communications network 108 shown and described above in connection with FIG. 1). In a fourth step 520, the client receives from the server via the communications network, asymmetric encryption components, a signed data file upload URL accessible by the communications network, and a signed key data upload URL accessible by the communications network. In a fifth step 525, the client encrypts, using the asymmetric encryption components, the symmetric encryption key and the initialization vector, thereby creating encrypted key information. In a sixth step 530, the client sends, via the signed data file upload URL, the encrypted data file to the first storage device. In a seventh step 535, the client sends, via the signed key data upload URL, the encrypted key information to a second storage device. In some embodiments, other components perform one or more method steps: the server creates a record associating the client with the upload request, the record including a key-value map of asymmetric encryption; the first storage device (e.g., the first storage device 116) stores a copy of the encrypted data file; and/or the second storage device (e.g., the second storage device 120) stores a copy of the encrypted key information.

Generally, the above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a plasma or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a server. The server can, for example, be a data server, a middleware component, and/or an application server. The above described techniques can be implemented in a distributed computing system that includes a client. The client can, for example, be any computing device having a graphical user interface, a Web browser through which a user can interact with an example implementation, and/or other graphical user interfaces for a transmitting device. The above described techniques can be implemented in a distributed computing system that includes any combination of such server and/or client components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Client devices can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computer-implemented method of securely uploading a data file using a computing device, the method comprising:
    generating, by the computing device, a symmetric encryption key and an initialization vector;
    encrypting, by the computing device, the data file using the symmetric encryption key and the initialization vector, thereby creating an encrypted data file;
    placing an upload request, by the computing device, to upload the encrypted data file to a first computer-readable data storage device, the upload request placed with a server computing device in electronic communication with the computing device via a data communications network;
    receiving, by the computing device, from the server computing device via the data communications network, asymmetric encryption components, a signed data file upload URL accessible by the data communications network, and a signed key data upload URL accessible by the data communications network;
    encrypting, by the computing device, using the asymmetric encryption components, the symmetric encryption key and the initialization vector, thereby creating encrypted key information;
    sending, by the computing device, via the signed data file upload URL, the encrypted data file to the first computer-readable data storage device; and
    sending, by the computing device, via the signed key data upload URL, the encrypted key information to a second computer-readable data storage device.

2. The method of claim 1 wherein encrypting the symmetric encryption key and the initialization vector further comprises:
    serializing, by the computing device, the symmetric encryption key and the initialization vector, thereby creating a serialized key data object; and
    structure padding, by the computing device, the serialized key data object to a predetermined length based on a size of an asymmetric key pair included in the asymmetric encryption components, thereby creating a byte padded key data object.

3. The method of claim 2 wherein the serialized key data object is structure padded with nondeterministic random data.

4. The method of claim 2 wherein the serialized key data object is created prior to placing the upload request.

5. The method of claim 2 wherein the serialized key data object is in key-value format.

6. The method of claim 1 further comprising creating, by the server computing device, a record associating the computing device with the upload request, the record including a key-value map of asymmetric encryption components.

7. The method of claim 6 wherein the record is specific to the upload request.

8. The method of claim 1 further comprising storing, by the first computer-readable data storage device, a copy of the encrypted data file, and storing, by the second computer-readable data storage device, a copy of the encrypted key information.

9. The method of claim 1 wherein the symmetric encryption key includes a block cipher that utilizes the initialization vector to randomize repeated sequences in the data file.

10. The method of claim 1 wherein the initialization vector is unique to the upload request.

11. The method of claim 1 wherein the initialization vector is generated independently of the encrypted data file or the encrypted key information.

12. The method of claim 1 wherein the initialization vector is generated independently of previous encryption requests.

13. The method of claim 1 wherein the server computing device does not read or receive either the symmetric encryption key or the initialization vector in either encrypted or unencrypted form, and wherein the server computing device does not read or receive the data file or the encrypted data file.

14. The method of claim 1 wherein the asymmetric encryption components include an asymmetric key pair including a private exponent and a public exponent, a modulus, prime factors, and precomputed remainders.

15. The method of claim 14 wherein the asymmetric key pair is unique to the upload request.

16. The method of claim 14 wherein the server computing device does not sign the asymmetric key pair.

17. The method of claim 14 wherein the server computing device does not use the asymmetric key pair for any purpose other than to associate the asymmetric encryption components with the upload request.

18. The method of claim 1 wherein the server computing device provides only asymmetric key information required for encryption associated with the upload request.

19. The method of claim 1 wherein the first computer-readable data storage device is independent of, and remote from, the server computing device, and the second computer-readable data storage device is independent of, and remote from, the server computing device.

20. The method of claim 1 wherein the first computer-readable data storage device is independent of the second computer-readable data storage device.

21. The method of claim 1 wherein the signed data file upload URL includes only write-only access to the first computer-readable data storage device and the signed key data upload URL includes only write-only access to the second computer-readable data storage device.

22. The method of claim 1 wherein the server computing device generates the signed key data upload URL with a first predetermined timeout threshold and the signed data file upload URL with a second predetermined timeout threshold.

23. The method of claim 1 wherein the signed data file upload URL and the signed key data upload URL are each encoded with a timeout parameter and address restrictions.

24. The method of claim 1 wherein the encrypted data file and the encrypted key information are cacheable locally on the computing device in an encrypted format.

25. The method of claim 1 wherein the asymmetric encryption components are delivered in an unencoded format.

26. A computer-implemented system for uploading securely a data file, the computer-implemented system comprising:
- a computing device generating a symmetric encryption key and an initialization vector; encrypting the data file using the symmetric encryption key and the initialization vector, thereby creating an encrypted data file; placing an upload request to upload the encrypted data file; receiving asymmetric encryption components, a signed data file upload URL, and a signed key data upload URL; encrypting, using the asymmetric encryption components, the symmetric encryption key and the initialization vector, thereby creating encrypted key information; and transmitting data over a data communications network in electronic communication with the computing device;
- a server computing device in electronic communication with the data communications network, the server computing device receiving the upload request; creating a record associating the computing device with the upload request; and providing to the computing device the asymmetric encryption components, the signed data file upload URL, and the signed key data upload URL;
- a first computer-readable data storage device in electronic communication with the data communications network, the first computer-readable data storage device receiving and storing a copy of the encrypted data file; and
- a second computer-readable data storage device in electronic communication with the data communications network, the second computer-readable data storage device receiving and storing a copy of the encrypted key information.

27. The system of claim 26 wherein the first computer-readable data storage device is independent of, and remote from, the server computing device, and the second computer-readable data storage device is independent of, and remote from, the server computing device.

28. The system of claim 26 wherein the first computer-readable data storage device is independent of the second computer-readable data storage device.

29. The system of claim 26 wherein the server computing device does not read or receive either the symmetric encryption key or the initialization vector in either encrypted or unencrypted form.

30. The system of claim 26 wherein the server computing device does not read or receive the data file or the encrypted data file.

* * * * *